Figure 1:
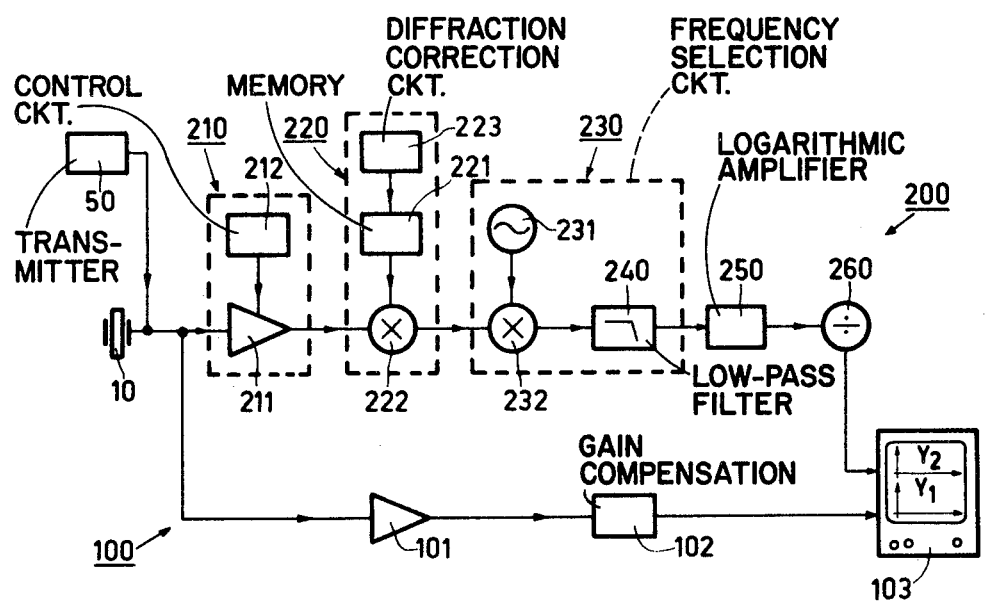

United States Patent [19]

Hottier

[11] 4,446,737

[45] May 8, 1984

[54] METHOD AND DEVICE FOR MEASURING OBJECTS USING ULTRASOUND ECHOGRAPHY

[75] Inventor: François Hottier, La Varenne, France

[73] Assignee: U.S. Philips Corporation, New York, N.Y.

[21] Appl. No.: 492,849

[22] Filed: May 9, 1983

[30] Foreign Application Priority Data

Oct. 13, 1982 [FR] France .................. 82 17141

[51] Int. Cl.³ ............................................. G01N 29/00
[52] U.S. Cl. ...................................... 73/602; 73/631; 123/660
[58] Field of Search .................. 73/631, 597, 599, 629, 73/900, 602; 128/660; 123/660

[56] References Cited

U.S. PATENT DOCUMENTS

| | | | |
|---|---|---|---|
| 3,307,408 | 4/1964 | Thomas | 73/599 X |
| 3,662,589 | 5/1972 | Adler | 73/602 |
| 4,016,750 | 4/1977 | Green | 73/629 |
| 4,102,205 | 7/1978 | Pies | 73/631 |

*Primary Examiner*—Gerald Goldberg
*Assistant Examiner*—E. Harding
*Attorney, Agent, or Firm*—Jack E. Haken

[57] ABSTRACT

A device for the scanning of objects by means of ultrasound echography comprises a first ultrasonic transducer (10) which is connected to a transmitter stage (50) for the repeated transmission of ultrasonic signals and to a receiver stage (100, 200) for receiving the ultrasonic echoes which correspond to the most important obstacles encountered by the tramsmitted signals in their propagation direction, said receiver stage comprising a first, known processing circuit (100) and, connected parallel thereto, a second processing circuit (200) which consists of a series connection of a control circuit (210) for the automatic control of the gain as a function of the distance of the echoes, a correction circuit (220) for the correction of transducer diffraction effects, a selection circuit (230) for the selection of a narrow frequency band within the pass-band of the transducer which is centered around a frequency $F_c$, a logarithmic amplifier (250) and a divider circuit (260) which divides the output of the logarithmic amplifier by a factor proportional to the frequency $F_c$ and whose output signal is applied to a second channel of the display device of the processing circuit (100).

10 Claims, 3 Drawing Figures

METHOD AND DEVICE FOR MEASURING OBJECTS USING ULTRASOUND ECHOGRAPHY

The invention relates to a device for the scanning of objects, notably biological tissues, by means of ultrasound echography, comprising at least one ultrasonic transducer which is connected to a transmitter stage for the repeated transmission of ultrasonic signals and to a receiver stage for receiving the ultrasonic echoes corresponding to the most important obstacles encountered by the transmitted signals in their direction of propagation, said receiver stage comprising a first processing circuit for the echoes received which consists mainly of a first amplifier which is connected to the output electrode of the ultrasonic transducer, a gain compensation device, and a display device for displaying the positions of the echoes in the scanning direction as a function of time as well as the amplitudes thereof.

A device of this kind is proposed in the previous French Patent Application No. 8119585, which corresponds to U.S. patent application Ser. No. 411,731, filed Aug. 26, 1982. Said device notably comprises a processing stage for the echoes received which consists of a first and a second processing circuit. The first processing circuit is of a known type and consists mainly of a first amplifier for the signals present on the output electrode of the transducer, a gain compensation device, and a display device. The second processing device which is connected parallel to the first processing device comprises (a) a second amplifier which is also connected to the output electrode of the transducer, (b) a group of n parallel channels which are connected to the output of the second amplifier and each of which successively comprises a band-pass filter (the pass-bands of the various filters thus obtained being substantially consecutive so that together they span approximately the pass-band of the second amplifier) and an envelope detector (consisting of a rectifier and a low-pass filter having a variable time constant), (c) an arithmetic circuit which is connected to the output of the n channels and which serves to calculate, on the basis of the output signals thereof, a parameter which is an indicator for the spread of the amplitudes of the signals of central frequency of each of the channels and which is also directly locally correlated to the mean slope (the so-called differential ultrasonic attenuation factor) of the curve of the variation of the ultrasonic attenuation as a function of the frequency in the tissues scanned, and (d) a circuit which is connected to the output of this arithmetic circuit in order to determine the value of this factor within each of the zones in the tissues scanned which are bounded by the echoes corresponding to the most important obstacles encountered, the output signals of this factor-determining circuit modulating the picture displayed on the display device.

The device thus constructed is important because of the fact that it enables quantitative information to be obtained by the local calculation of a parameter which is directly correlated to the differential ultrasonic attenuation factor; subsequently the values of this factor can be directly displayed in A-type or B-type echography. The assembly of such an apparatus, however, is complex notably due to the presence of the block of n filters; even if parts of this device are replaced by software, the calculation to be performed still require a comparatively long period of time.

It is an object of the invention to provide a device of the kind set forth which is simpler than the described, known device.

To this end, the device in accordance with the invention is characterized in that the receiver stage comprises a second processing circuit which is connected parallel to the first processing circuit and which consists of a series-connection of a control circuit for automatic control of the gain as a function of the distance of the echoes, a correction circuit for correcting diffraction effects, a selection circuit for selecting a narrow frequency band which is centred around a frequency $F_c$ within the pass-band of the transducer, a logarithmic amplifier, and a divider which divides the output of the selection circuit by a factor which is proportional to $F_c$, whose output signal is applied to the display device.

Such a construction of the device is distinguished by the fact that, from the successive instantaneous frequency spectra of the output signal of the transducer, only narrow frequency zones are taken into account which are centred around the frequency which is most suitable for the analysis of the objects to be examined. For expressing the value of the energy in this frequency band, thanks to the fact that this value I is proportional to $E^{-\beta F_c d}$ (in which $\beta$ is the differential ultrasonic attenuation factor, $F_c$ is the central frequency of the band selected and d is the distance of the tissues), when the units are suitably chosen the characteristics $I_{dB}=f(d)$ will be shaped, for a constant value of $\beta$ and $F_c$, as straight lines whose mean slope always directly represents the value of the ultrasonic attenuation.

Figure 2:
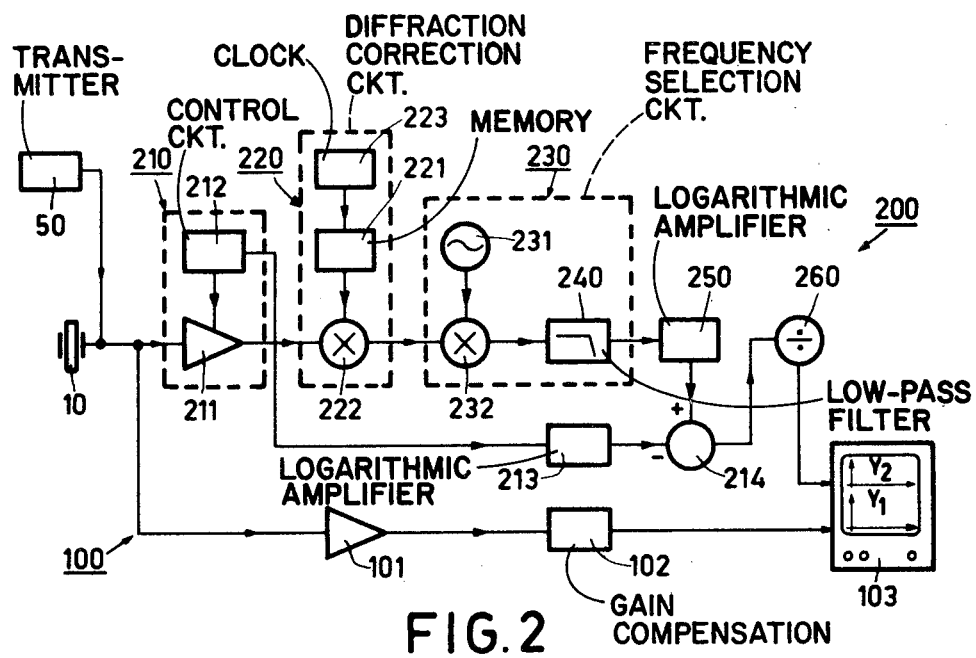
Figure 3:
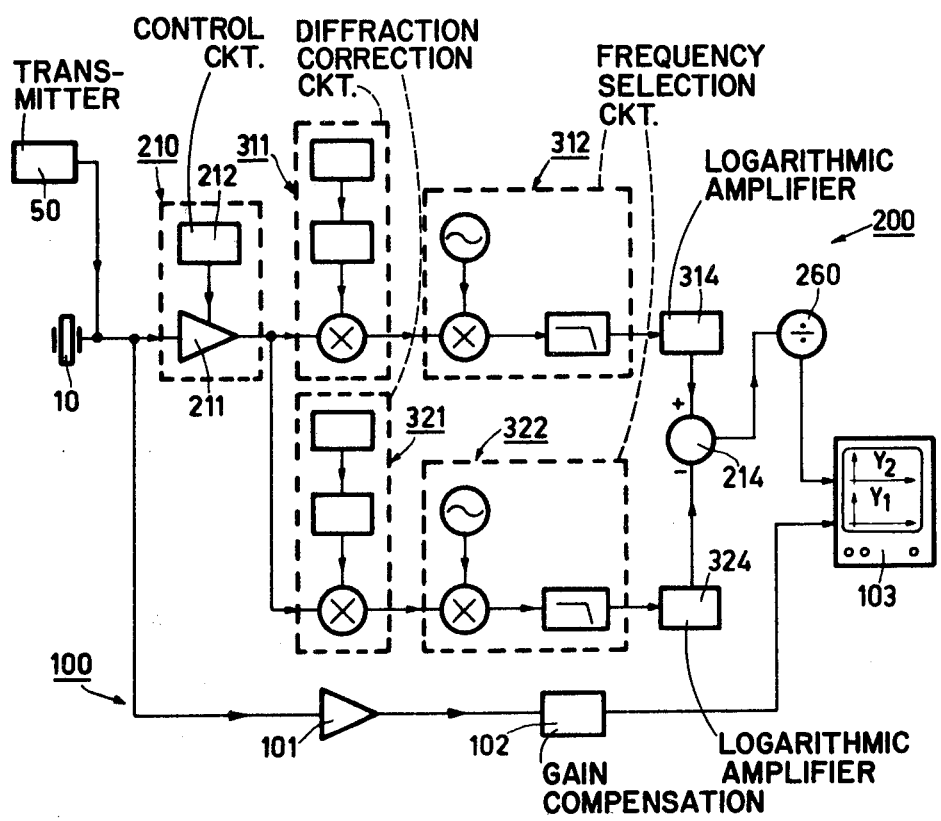

The invention will be described in detail hereinafter with reference to the accompanying drawings. Therein:

FIGS. 1 through 3 show three embodiments of the device for the scanning objects in accordance with the invention.

The embodiments of the device described with reference to the figures comprise a single probe which forms a carrier for an ultrasonic transducer 10 and which can be used to obtain A-type echograms. The invention can also be used in exactly the same way when instead of only one line a complete plane section of the tissues is examined, either by means of a probe which is connected to a radar-type display device with manual displacement or with mechanical sector scanning, or by means of a linear array of p ultrasonic transducers which define a corresponding number of (p) parallel scanning directions in the tissues to be examined, said array being connected to a switching circuit whereby the echo processing device is successively connected to each activated transducer or group of transducers, or also by means of an array of transducers with electronic sector scanning which is also connected to a switching circuit and to a network of delay lines or phase shifters.

The transducer 10 is connected on the one side to a transmitter stage 50 which serves to ensure that the transducer can repeatedly transmit ultrasonic signals in an arbitrary scanning direction through the tissues to be examined and on the other side to a receiver stage which serves for the processing of the ultrasonic echoes which are received by the transducer and which correspond to the most important obstacles encountered by the transmitted signals in their propagation direction. The situation of such obstacles is defined in the echograms by the echoes of high amplitude which indicate the boundaries between the tissues for which the differential ultrasonic attenuation factors are to be determined.

The output electrode of the transducer 10 is connected to the input of the amplifier 101 whose output signals are applied to the gain compensation device 102 whereby the amplitude of the echoes is compensated for in dependence of the distance (TGC), after which these signals are displayed on the display device 103 in the form of an A-type echogram along an axis which corresponds to the principal propagation direction of the transducer 10.

The receiver stage in accordance with the invention also comprises a second processing circuit 200 which is connected parallel to the first processing circuit 100 and which consists of the following elements:

(a) a control circuit 210 which is connected to the output electrode of the transducer 10 for the automatic control of the gain as a function of the distance of the echoes;

(b) a correction circuit 220 for the correction of diffraction effects;

(c) a selection circuit 230 for the selection of a frequency band which is centred around the frequency $F_c$ of the spectrum of the transducer which corresponds to the maximum power, said circuit consisting of an oscillator 231, a multiplier 232 and a low-pass filter 240;

(d) a logarithmic amplifier 250;

(e) a divider 260 which is adapted to divide by the value of the center frequency, $F_c$.

This stage operates as follows: as soon as the corrections of the gain as a function of time and the diffraction have been performed, the frequency band of the signal thus obtained on the output of the circuit 220 is converted to a base band by mixing this signal with the output signal of the oscillator 231 in the multiplier 232, and by subsequently filtering this signal in the low-pass filter 240. Because, as has already been described, the ultrasonic energy in this frequency band is proportional to $e^{-\beta F_c d}$, only the logarithmic amplifier 250 and the divider 260 need be connected to the output of the circuit 230 in order to produce a signal on the output of this divider whose amplitude is directly locally correlated to the mean slope $\beta$ of the curve representing the variation of the ultrasonic attenuation as a function of the frequency in the tissues scanned (this slope $\beta$ is referred to as the differential ultrasonic attenuation factor). It is to be noted that the frequency $F_c$ is chosen to be equal to either the frequency corresponding to the maximum power which can be delivered by the transducer or to a frequency which is lower than the frequency corresponding to this maximum power in order to take into account the fact that the tissues examined bahave as a low-pass filter.

In the present embodiment, the output signals of the gain compensation device 102 and the divider 260 modulate the image displayed on the display device 103 as follows: the image comprises on the one hand the known A-type echogram which is supplied by the first processing circuit and which is applied to a first channel $Y_1$ of the device 103 and on the other hand a stepped curved which is displayed on a second channel $Y_2$ and which represents the various values of the ultrasonic attenuation factor between the boundaries defined by the echogram of the channel $Y_1$ (these boundaries correspond to the most important obstacles encountered in the tissues and are, therefore, displayed as the echoes of high amplitude of the echogram of the channel $Y_1$).

The correction circuit 220 for the correction of the diffraction effects mainly comprises a memory 221 and a multiplier 222. This memory is controlled by a clock circuit 223 and contains the necessary correction signals for correction as a function of the distance from the transducer, said signals being applied to the multiplier 222; their values have been stored in an advance after a calibration phase. In the case of a non-focusing transducer, it is merely necessary for this calibration phase to take into account the echo signals of the selected transducer when the latter is arranged opposite a reflective metal surface which is successively situated at all distances from the transducer which correspond to the customary depths in echographic examinations or, in the more common case of a focusing transducer, the echo signals which are obtained by the use of phantoms whose ultrasonic properties are exactly known, the echo signals thus obtained enabling the storage of correction factors in the memory 221 which is a PROM memory in this embodiment.

A known control circuit for the automatic gain control comprises a controllable amplifier 211 which is controlled by the actual control circuit 212. For accurate energy measurement in accordance with the invention it is desirable to fix this gain temporarily between two instants $t_1$ and $t_2$; this represents the actual period of time required for the execution of the measurement. This result is obtained by including a time window in the control circuit 210 during which the gain variation of the amplifier is suspended.

In order to suspend the gain variation it is also possible to omit modification of the control circuit 210 and to obtain a similar effect at a later stage, either (see FIG. 2) by subtracting a signal which is proportional to the output signal of the control circuit 212 in a subtract circuit 214 from the input signal of the divider 260 after it has been passed through a second logarithmic amplifier 213 or by using two separate frequencies $F_{c1}$ and $F_{c2}$ (see FIG. 3). In the latter case, two identical, parallel-connected channels must be connected to the output of the control circuit 210 for the automatic gain control, each of said channels comprising a correction circuit 311, 321, respectively, for the correction of the diffraction effects (only if necessary), a selection circuit 312, 322, respectively, for the selection of a frequency band $F_{c1}$, $F_{c2}$, respectively, and a logarithmic amplifier 314, 324, respectively, whose outputs are connected to the inputs of the subtraction circuit 214. In that case the divider 260 is a divider adapted to divide by $F_{c1} - F_{c2}$.

Obviously, the invention is not restricted to the described embodiments; within the scope of the invention many alternatives are feasible. When the transducer 10 and its spectrum are known, notably the construction of the circuit can be simplified by using instead of the circuit 230 a simple band-pass filter whose pass-band is centered around $F_c$ which is chosen to be equal to the $F_c$ in the foregoing. This solution is cheaper than the foregoing solution, but the circuit then suits only one given transducer.

What is claimed is:

1. In a device for scanning objects by means of ultrasound echography of the type which comprises at least one ultrasound transducer, transmitter means connected to the transducer for repeated transmission of ultrasound energy, and receiver means connected to the transducer for receiving ultrasound echo signals which are produced from reflections of the transmitted energy, said receiver means comprising first processing circuit means for said echo signals which includes a first amplifier which is connected to receive signals from the output of the transducer, gain compensation means; and display means for displaying the position of the origin of the echo signals together with the amplitude of the echo signals, the improvement wherein:

the receiver means further comprise second processing means, connected in parallel with the first processing circuit means, which include, in functional series connection, automatic gain control means which increase the gain of the second processing circuit means as a function of the distance of the position of the origin of the echo signals from the transducer; diffraction correcting means which correct the amplitude of the echo signals for diffraction effects produced by the transducer; frequency selection means which pass echo signals in a narrow frequency band which is centered around a frequency $F_c$ within the bandpass of the transducer; a first logarithmic amplifier; and means which divide the output signal of the first logarithmic amplifier by a factor which is proportional to the frequency $F_c$ and apply the divided output signal to a display means.

2. A device as claimed in claim 1 wherein the frequency $F_c$ corresponds to a frequency at which the transducer supplies maximum transmitted power and wherein the frequency selection means comprises an oscillator for producing a signal having a frequency $F_c$ and multiplier means having a first input connected to the output signal of the oscillator and a second input connected to the output of the defraction correcting means and a low pass filter which receives the output signal from the multiplier and which provides a low pass filtered signal to the input of the first logarithmic amplifier.

3. A device as claimed in claim 1 wherein the frequency $F_c$ is lower than a frequency at which the transducer is capable of transmitting maximum power; wherein the frequency selection means comprise an oscillator for producing a signal having a frequency $F_c$, a multiplier having a first input connected to receive the output of the oscillator and a second input connected to receive the output of the diffraction correcting means, and a low pass filter connected to receive the output signal of the multiplier and to provide a low pass filtered output signal to the input of the first logarithmic amplifier.

4. A device as claimed in claim 1 wherein the frequency $F_c$ corresponds to the frequency at which the transducer is capable of transmitting maximum power and wherein the frequency selection means comprises a bandpass filter having a center frequency equal to $F_c$.

5. A device as claimed in claim 1 wherein the frequency $F_c$ corresponds to a frequency which is lower than the frequency at which the transducer is capable of transmitting maximum power and wherein the frequency selection means comprises a band pass filter having a center frequency equal to $F_c$.

6. A device as claimed in any one of claims 2 through 5 wherein the automatic gain control means further comprises control circuit means which suspend variations in the gain of the second processing circuit means for the duration of a time window during which attenuation measurements take place.

7. A device as claimed in any one of claims 2 through 5 wherein the automatic gain control means comprise a controllable amplifier and a control circuit for controlling the gain of the controllable amplifier; and wherein the device further comprises subtraction means connected in series between the first logarithmic amplifier and the divider means and having a positive input which receives the output signal from the first logarithmic amplifier and a negative input; and a second logarithmic amplifier having an input connected to the output of the control circuit and an output connected to the negative input of the subtraction means.

8. A device as claimed in any one of the claims 2 through 5 wherein the second processing circuit means comprises two identical, parallel-connected channels, each channel having an input connected to an output of the automatic gain control means, each channel comprising: diffraction correction means for correcting transducer defraction effects; frequency selection means which pass echo signals in a narrow frequency band, the frequency selection means in the first channel selecting a narrow frequency band centered at a frequency $F_{c1}$ and the frequency selection means in the second channel being selecting a narrow frequency band centered at a frequency $F_{c2}$, $F_{c1}$ being different from $F_{c2}$; each channel further comprising a logarithmic amplifier having an input connected to the output of the frequency selection means, the device further comprising a subtraction circuit, a positive input of the subtraction circuit being connected to the output of the logarithmic amplifier of the first channel and a negative input of the subtraction circuit being connected to the output of the logarithmic amplifier in the second channel; and means for dividing the output of the subtraction circuit by a factor which is proportional to the difference $F_{c1}-F_{c2}$ which is connected to apply the difference to the display means.

9. A method for determining relative values of the differential ultrasonic attenuation factor in zones of a biological tissue, comprising the steps of:

directing ultrasound energy into the tissue and detecting signals representative of echoes of said energy which are produced in said tissue;

generating an image from said detected signals wherein the positions of boundaries of zones in the tissue are determined by the points of origin of high amplitude echoes from said tissue;

correcting the values of said detected signals to compensate for variations in ultrasound field strength which are caused by transducer diffraction effects;

for one or more of the zones defined in the display, measuring a factor proportional to the energy of said returned echoes in a narrow frequency band of said detected signals; and calculating a value $\beta$ which is proportional to the differential ultrasonic attenuation factor from each of said energy values utilizing the formula $e^{-\beta F_c d}$, where $F_c$ is the center frequency of the narrow frequency band utilized and d is the distance which the ultrasound echos travel through the tissue from said zone to the point of detection; and displaying the calculated value of $\beta$ in association with each of the displayed zones.

10. A device for determining relative values of the differential ultrasonic attenuation factor in zones of a biological tissue, comprising:

means for directing ultrasound energy into the tissue and for detecting signals representative of echoes of said energy which are produced in said tissue;

means for generating an image from said detected signals wherein the positions of boundaries of zones in the tissue are determined by the points of origin of high amplitude echoes from said tissue;

means for correcting the values of said detected signals to compensate for variations in ultrasound field strength which are caused by transducer diffraction effects;

for one or more of the zones defined in the display, means for measuring a factor proportional to the energy of said returned echoes in a narrow frequency band of said detected signals; and means for calculating a value $\beta$ which is proportional to the differential ultrasonic attenuation factor from each of said energy values utilizing the formula $e^{-\beta F_c d}$, wherein $F_c$ is the center frequency of the narrow frequency band and d is the distance which the echoes travel through the tissue from the zone to the point of detection; and for displaying the calculated value of $\beta$ in association with each of the displayed zones.

* * * * *